Aug. 20, 1946.   J. V. MARANCIK ET AL   2,406,234
EXPANSION JOINT
Filed May 18, 1943   2 Sheets-Sheet 1
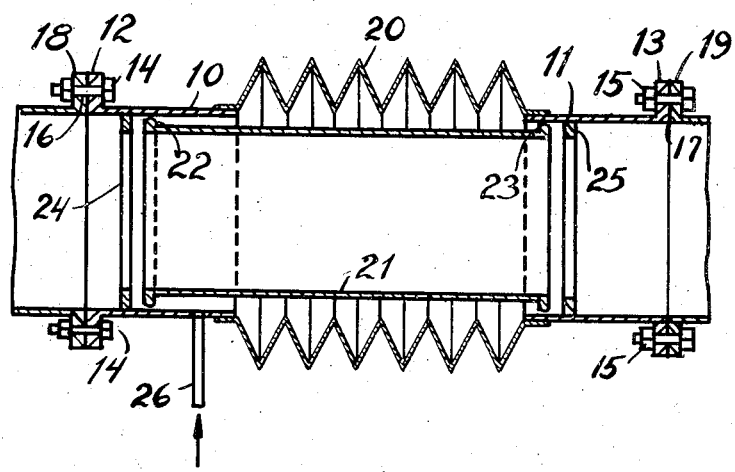
FIG.-1
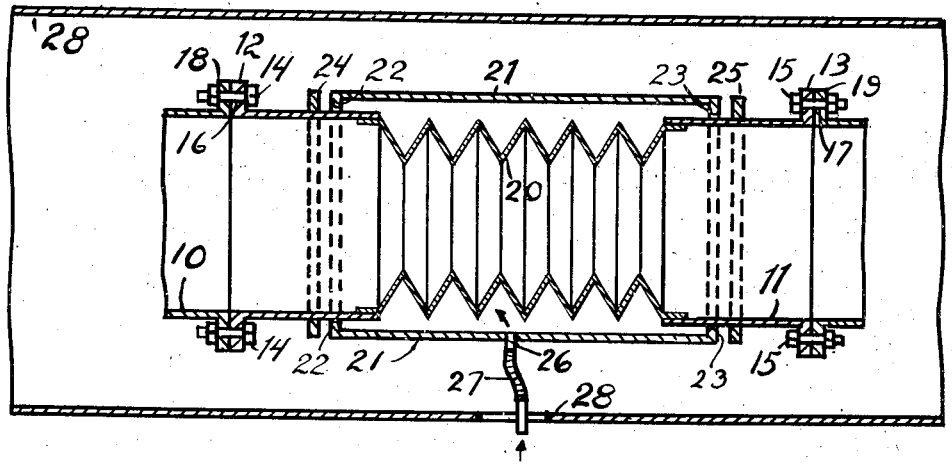
FIG.-II
Joseph V. Marancik  Inventors
Roy F. Mildrum
By  P. F. Young  Attorney

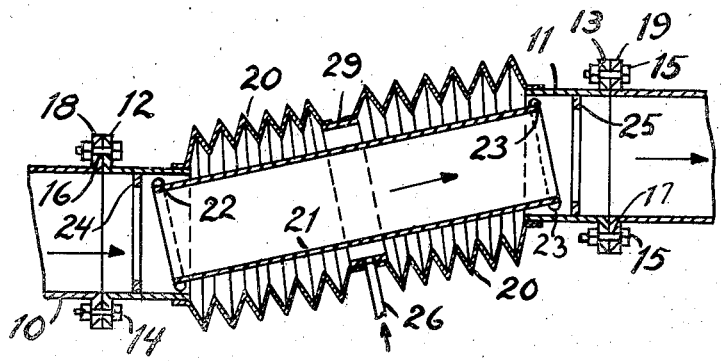
FIG.-III
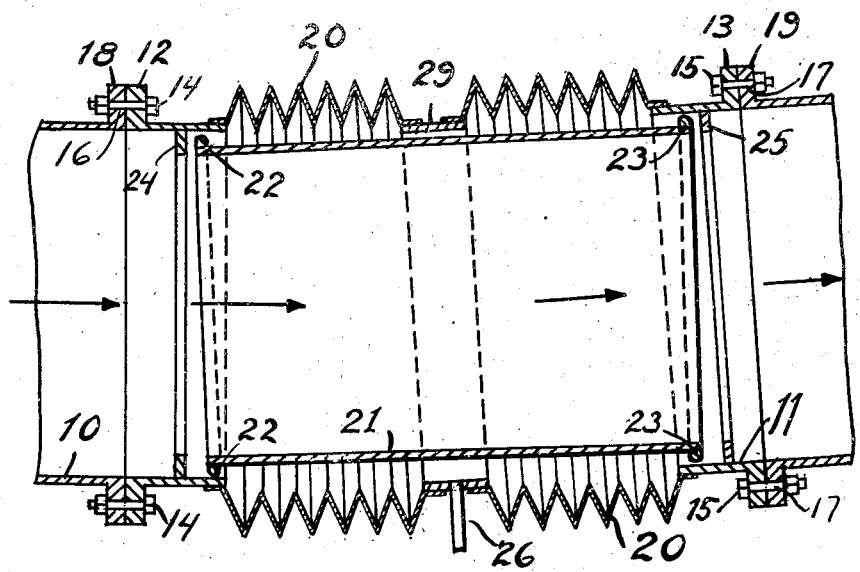
FIG.-IV
Joseph V. Marancik
Roy F. Mildrum Inventors
By P. L. Young Attorney Patented Aug. 20, 1946

2,406,234

UNITED STATES PATENT OFFICE 2,406,234

EXPANSION JOINT

Joseph V. Marancik, Roselle, and Roy F. Mildrum, Hillside, N. J., assignors to Standard Oil Development Company, a corporation of Delaware Application May 18, 1943, Serial No. 487,448

2 Claims. (Cl. 285—90)

This invention relates to flexible pipe joints and particularly to bellows-type joints adapted for installations carrying suspended solids and corrosive liquids.

In constructional engineering, provision has to be made for the dimensional changes occurring in supporting steel and in piping due to temperature variations. The expansive and contractive movements in the piping of process equipment must, moreover, be absorbed in the system without causing such strains as may subsequently lead to breakages and leakages in the equipment. The problem has to be particularly considered in the piping installations carrying suspended solids, such as in constructions for the heat treatment of minerals and for many types of petroleum refinery equipment. In the bellows-type joints commonly employed, there is a tendency for such suspended material to become deposited in the corrugations when the joint is in the expanded position, and thus to cause rupture of the bellows when the joint is forced to take the contracted position. The device of this invention overcomes this disadvantage. The device has also been found particularly suitable as an expansion joint in equipment constructed for the handling of finely divided solids and corrosive liquids.

It is an object of the invention to provide a flexible pipe joint adapted to absorb the longitudinal, angular, and misalignment changes as may occur due to temperature variation.

Another object of the invention is to provide an expansion joint with a flexible sealing member and an auxiliary sealing member which substantially limits contact of the fluid being transported through the joint with the flexible member, and also aids in the production of stream-lined flow through the joint.

A further object of the invention is to furnish for known bellows-type joints a flexible liner which minimizes contact of the fluid being transported with the bellows element, and also contributes to stream-lined flow of the fluid through the joint.

Other objects of the invention will be apparent from the following description and illustration of the invention:

In expansion joints of general usage, there are often circular bellows or corrugated expansible elements connected to the piping, coupled with an inner liner element attached at one end to the piping thus allowing the other end of the liner to slide inside the other portion of the piping. The purpose of the liner is to reduce wear on the expansible element, and to assist stream-lined flow. Such an arrangement limits considerably the absorption of angular and misalignment effects without preventing substantial amount of the material being transported through the piping from getting in between the liner and the corrugated element. The leakage of an inert fluid into the space between the corrugated element and the liner is not usually particularly disadvantageous; but, when the fluid is of a corrosive nature or when suspended solids are being transported, the infiltration is highly disadvantageous and often the cause of premature destruction of the expansion element.

In the prior art it has been proposed to prevent the infiltration of corrosive materials and finely divided solids into the space between the liner and the expansion element by the use of packing material placed in a groove located at the free end of the liner. The packing material may be any suitable wear-resistant composition, or it may be of a suitable metal in the form of a piston ring. The effect is thus to seal off the space between the liner and the flexible element, and to reduce still further the capacity of the joint to absorb angular and misalignment changes.

In the present invention an improvement over such type packed expansion joints is in the elimination of the packing element and the injection of a fluid—usually steam or air—into the space between the expansible element and the liner at a slightly greater pressure than that of the fluid passing through the piping system. The injected fluid then escapes into the pipe line through the annular clearance provided around the end of the liner by eliminating the packing. Thus, the infiltration into the expansible element of harmful material is prevented by the flow of fluid into the piping installation from the bellows chamber of the expansion joint. The same objective may be achieved by substituting spacer rings attached to the fixed pipes instead of flanging the ends of the liner.

In order to provide particularly for movements causing both misalignment and angular displacement and at the same time permit maintaining provision to prevent deposition of solids in the corrugations of the bellows element, the added feature is presented of flanging the free end of the liner outwards so that the end of the liner acts as a spacer between the liner and the inner surface of the pipe with a small clearance between the flanged end and the pipe. Provision for greater misalignment and angular movements may be had by having a floating liner with both ends having an outwardly directed flange separated by a small clearance from the inner surface of the pipe. As steam, air, or other fluid under a pressure slightly greater than that prevailing in the inside of the liner is injected into the space between the liner and the bellows element, there is always a relatively uniform flow of fluid through the spacer clearance into the piping system. This action prevents any material from the inside of the liner getting between the liner and the flexible element. For economic reasons the clearance must be held to a practical minimum in order to limit the amount of injected fluid which will be required to secure positive unidirectional flow through the entire area of the annular space formed by the clearance. The clearance will vary somewhat with the pipe size but will normally not exceed 1/16".

In some cases the fluid carrying the suspended solids may be exterior to the bellows element and some other fluid may be passing through the interior of the bellows element. In these cases the liner, now more properly called a shield is placed outside the bellows element, and this protects the element from the infiltration of the finely divided solids getting in between the corrugations. When protection of the bellows element is necessary on the two sides, both liner and shield may be employed.

As an illustration of the invention, example may be taken of the device incorporated in the piping installation of a catalytic cracking unit employing clay in a fine state of division in suspension as a catalytic material. A similar form of the device may be employed for installations in petroleum coking equipment and in the heat treatment of minerals.

Figure I presents diagrammatically a simple form of an embodiment of the invention. Figure II shows another embodiment with the liner element exterior to the expansion element. Figure III shows a third embodiment of the invention under misalignment conditions. Figure IV shows an embodiment under angular displacement conditions. In the various drawings the same numerals refer to the corresponding parts.

In Figures I and II two aligned pipes 10 and 11 are shown as having flanged end pieces 12 and 13 for connection by means of bolts 14 and 15, fitted through bolt holes 16 and 17 to ends 18 and 19 of the piping system. Between the pipes 10 and 11 is the bellows element 20 and connected thereto, preferably by welding. In these drawings only one bellows element respectively is shown as connecting the pipes 10 and 11. In many cases however two or more bellows elements are employed—the number being determined by the conditions of the installation especially as to the probable extent of the dimensional changes and the probable occurrence of angular movement or misalignment at the expansion joint. In Figures III and IV two bellows elements are shown as a means for adequately providing for the angular and misalignment displacements at the joint.

Encased and wholly surrounded by the bellows element 20 and the ends by portions of pipes 10 and 11 is a liner or sleeve element 21, and having a diameter sufficiently different as to allow the terminal flanged spacers or rings 22 and 23 to give a clearance in normal position from the pipes 10 and 11 of approximately 1/16 of an inch.

On pipes 10 and 11 at some short distance from the ends of the sleeve 21 are inwardly directed flanges 24 and 25 (which act as stops to maintain the position of the liner). There is a fluid inlet jet 26 through which the fluid—usually steam—is passed into the space between the bellows and the liner element at a slightly higher pressure than that upon the material passing through the inside of the joint. The fluid thus injected passes through the clearance between the spacer element 22 and the stop 24; and the spacer element 23 and the stop 25. In Figure II the sleeve 21 is outside of the bellows element 20 and the fluid inlet 26 is connected by flexible tubing 27 to the outside casing 28 connected to the system from which the stream carrying the suspended solids are obtained.

In Figure III, illustrating misalignment, two bellows elements 20 are shown as being connected by an annular member 29. Located in the annular member may be suitably placed the fluid inlet 26. In Figure IV, illustrating angular displacement, two bellows elements 20 again are shown as being connected by an annular member 29 carrying the fluid inlet 26, the liner freely moving subject to the restriction of the stops 24 and 25. Thus the angle of contact of the liner element with the rigid piping portions of the device need be only half that which occurs when the liner element is fixed at one end, as in the devices of the prior art. This is a particular feature of improvement over the devices of the prior art, since more uniform conditions of flow prevail through the joint as a result of the reduction in angular displacement. Moreover, due to the free movement of the liner element between the stops, the fluid distribution through the spacer clearance from the space between the bellows and liner elements is not greatly disturbed upon deflection due to angular or misalignment changes.

The device of this invention is particularly suited as part of equipment adapted to the heat treatment of hydrocarbons but the invention is not restricted to such application but may be utilized in any piping system in which temperature changes may be encountered. In the cracking of hydrocarbons with a powdered catalyst, temperatures of between 700° F. and 1100° F. or higher are often used and in the regeneration of the powdered catalyst temperatures as high as 1400° F. may be used. With such high temperatures the expansion of the piping system frequently involving pipe sizes up to about 72 in. in diameter becomes a factor of importance and one of the problems in existing equipment was concerned with the development of suitable expansion joints which could be used under such conditions. Also, in the catalytic cracking of hydrocarbons using powdered catalyst of between 200 and 400 standard mesh, the pipe sections may be large conduits or pipes and may be as large as 8 ft. in diameter. With such large pipes and high temperatures the expansion joint of this invention with the provision for movements causing both misalignment and angular displacement has been found to function very satisfactorily.

What is claimed is:

1. An expansion pipe joint comprising two aligned pipes for conveying fluid carrying injurious materials of the type of suspended solids and corrosive materials, a bellows section connecting the adjoining ends of the pipes to permit longitudinal, angular and misalignment movements of the pipes due to temperature variation, a longitudinal annular member protecting said bellows section permitting longitudinal, lateral and angular play of ends of said pipes, an annular spacer near at least one end of said annular member reducing the clearance between said pipe and said annular member, and means for introducing a gas under slightly greater pressure than that of said fluid into the space between said bellows section and annular member so that said fluid is prevented from infiltration into corrugations of said bellows section.

2. An expansion joint according to claim 1 in which the said annular spacer is attached to the end of the liner forming an annular flange protruding from said liner.

JOSEPH V. MARANCIK.
ROY F. MILDRUM.